(12) United States Patent　　(10) Patent No.: US 7,848,471 B2
Hidaka　　(45) Date of Patent: Dec. 7, 2010

(54) METHOD AND SYSTEM FOR ON-LINE DATA-PATTERN COMPENSATED ADAPTIVE EQUALIZER CONTROL

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 11/862,823

(22) Filed: Sep. 27, 2007

(65) Prior Publication Data

US 2009/0086809 A1　Apr. 2, 2009

(51) Int. Cl.
*H04B 1/10*　(2006.01)
(52) U.S. Cl. .................. 375/350; 375/229; 375/232; 375/343; 375/346
(58) Field of Classification Search ......... 375/229–236, 375/343, 346–350
See application file for complete search history.

(56) References Cited

U.S. PATENT DOCUMENTS

| | | | | |
|---|---|---|---|---|
| 3,701,894 | A | * | 10/1972 | Low et al. .................. 708/422 |
| 5,173,925 | A | * | 12/1992 | Mizoguchi .................. 375/232 |
| 2004/0161053 | A1 | * | 8/2004 | Cavers et al. ............... 375/297 |
| 2005/0276360 | A1 | * | 12/2005 | Fujii et al. .................. 375/347 |

\* cited by examiner

*Primary Examiner*—Curtis B Odom
(74) *Attorney, Agent, or Firm*—Baker Botts L.L.P.

(57) ABSTRACT

In accordance with a particular embodiment of the present invention, a method is offered that includes providing a filter and an adaptive control element that is operable to communicate with the filter. The method also includes measuring, over a period, a data correlation matrix and an uncompensated error correlation vector using first and second low pass filters. In addition, the method includes implementing a data-pattern compensation matrix online, whereby the data-pattern compensation matrix is obtained online dynamically from the data correlation matrix.

23 Claims, 4 Drawing Sheets

METHOD AND SYSTEM FOR ON-LINE DATA-PATTERN COMPENSATED ADAPTIVE EQUALIZER CONTROL

RELATED APPLICATIONS

This application is related to U.S. patent application Ser. No. 11/862,799, entitled "METHOD AND SYSTEM FOR PROVIDING FAST AND ACCURATE ADAPTIVE CONTROL METHODS," and U.S. patent application Ser. No. 11/862,838, entitled "METHOD AND SYSTEM FOR STATIC DATA-PATTERN COMPENSATED ADAPTIVE EQUALIZER CONTROL," both filed concurrently with the present application.

TECHNICAL FIELD OF THE INVENTION

This invention relates generally to the field of data communications and, more specifically, to a system for on-line data-pattern compensated adaptive equalizer control.

BACKGROUND OF THE INVENTION

An equalization (EQ) filter is a filter, usually adjustable, typically meant to compensate for the unequal frequency response of some other signal processing circuit or system. Such filters usually allow the user to adjust one or more parameters that determine the overall shape of the filter's transfer function. Equalizers may be designed with peaking filters, shelving filters, or high-pass and low-pass filters.

In a digital transmission system, an equalizer is often used to compensate for inter-symbol interference due to frequency-dependent loss such as skin effect and dielectric loss. An adaptive equalizer that automatically adjusts equalizer parameters to the current channel characteristics is generally desired. This is because the channel characteristics are typically unknown a priori. As with all such processing operations, of critical importance are issues relating to speed, accuracy, and automation.

SUMMARY OF THE INVENTION

The present invention provides a method and a system for providing continuous adaptive control using online data-pattern compensation that substantially eliminates or reduces at least some of the disadvantages and problems associated with previous optimization methods and systems.

In accordance with a particular embodiment of the present invention, a method is offered that includes providing a filter and an adaptive control element that is operable to communicate with the filter. The method also includes measuring, over a period, a data correlation matrix and an uncompensated error correlation vector using first and second low pass filters. In addition, the method includes implementing a data-pattern compensation matrix online, whereby the data-pattern compensation matrix is obtained online dynamically from the data correlation matrix.

In more particular embodiments, the low pass filters measure correlation of a data sequence such that the measured correlation is compensated for. After the period ends, the data-pattern compensation matrix is calculated as the inverse of the data correlation matrix and multiplied with the uncompensated error correlation vector to yield a compensated error correlation vector.

In still other embodiments, the compensated error correlation vector is multiplied with an adaptation matrix and a loop constant and then integrated to generate tap weights. If the data correlation matrix is not invertible, an adaptive control is skipped, and then a next measurement is taken. The method can be used with a general ZF adaptation scheme using a constant adaptation matrix. In addition, the method can be used with a fast steepest-descent method using a variable adaptation matrix.

Technical advantages of particular embodiments of the present invention offer benefits from use of a continuous adaptive control using online data-pattern compensation. Such an architecture does not require a scrambler and a descrambler and, thereby, does not include the latency for the scrambler and a descrambler. Furthermore, such an arrangement is applicable for existing standard interfaces without changes to encoding or to protocol.

Moreover, the configuration minimizes the square error for uncorrelated data sequences using any data-pattern. In addition, such an approach automatically stops when the data-pattern does not include sufficient information, which is advantageous.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
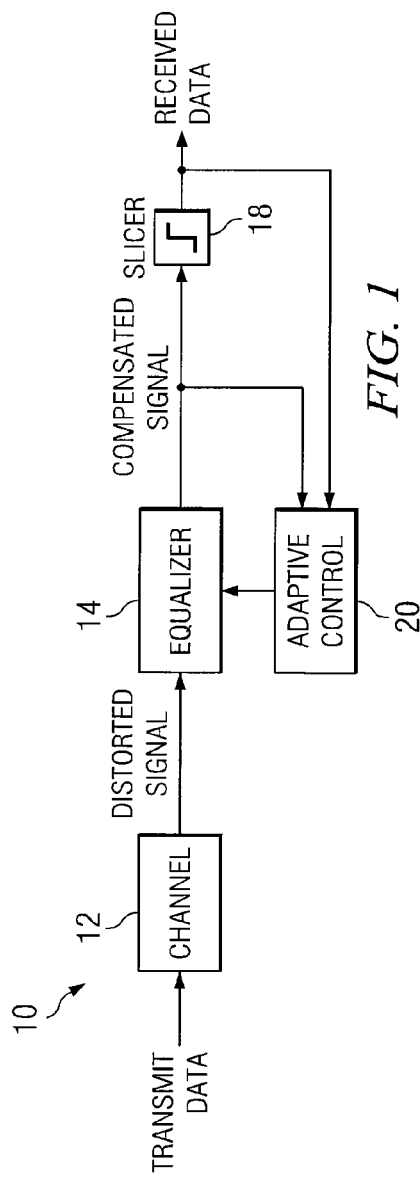
FIG. 1 is a simplified diagram illustrating a digital transmission system with an adaptive equalizer related to one embodiment of the present invention.

FIG. 1 is a simplified diagram illustrating a digital transmission system with an adaptive equalizer 10 related to one embodiment of the present invention. FIG. 1 includes a channel 12, an equalizer 14, a slicer 18, and an adaptive control 20.

A prior scheme of the adaptive equalizer control is the general Zero-Forcing (ZF) algorithm. Filter output y(k) is a linear weighted sum of tap outputs of the filter bank. Differences between the recovered data d(k) and the filter output y(k) yields an error signal e(k). Correlation between the error signal e(k) and the recovered data d(k) [with some delays] forms error correlation vector $\{e_j(k)\}^T$. The error correlation vector is multiplied with an adaptation matrix M and a loop constant μ, then it is integrated to generate the tap weights $\{w_i\}^T$.

Figure 2:
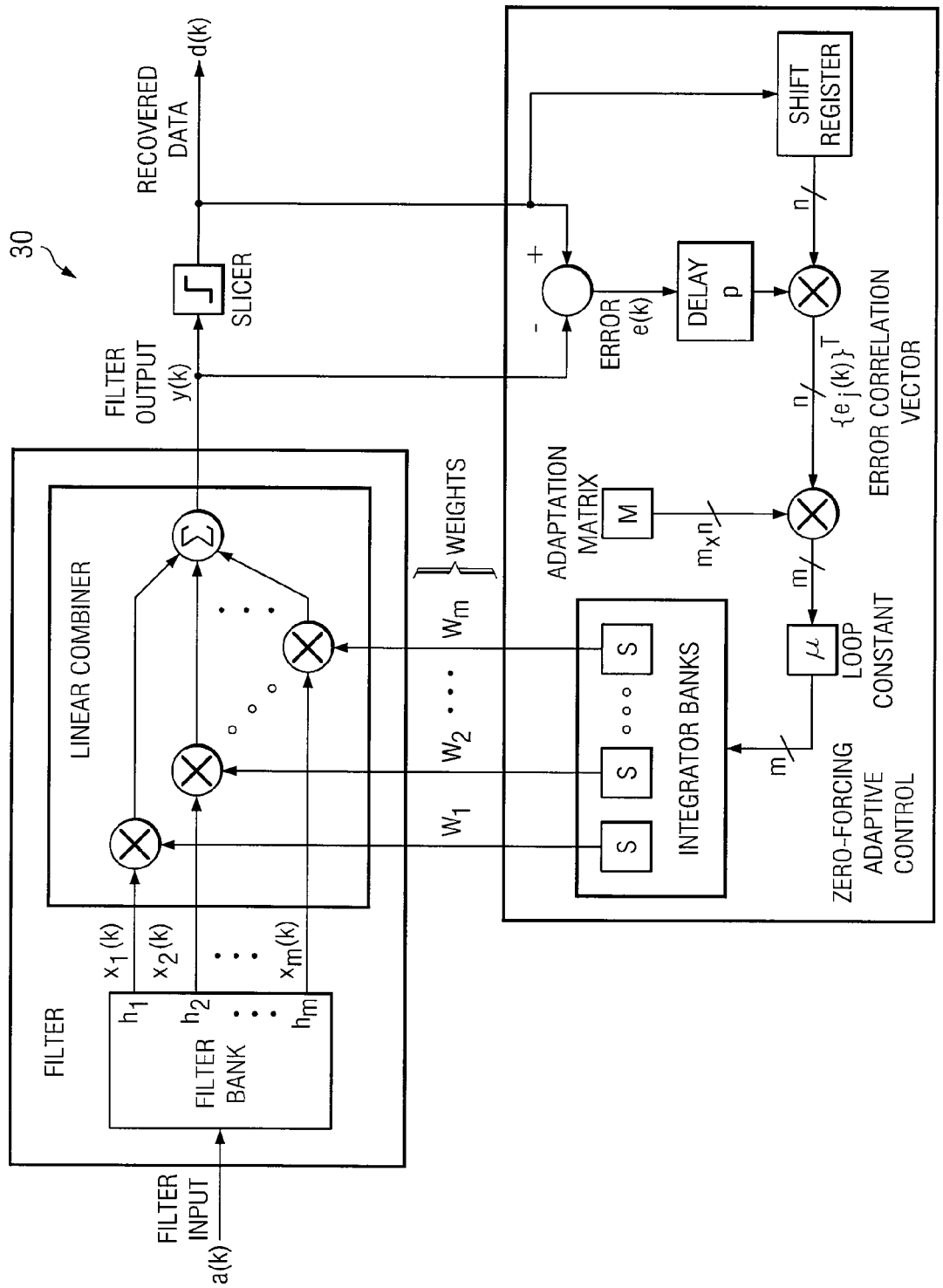
FIG. 2 is a simplified block diagram illustrating an adaptive equalizer using a Zero-Forcing (ZF) algorithm.

FIG. 2 is a simplified block diagram illustrating an adaptive equalizer 30 using the Zero-Forcing algorithm.

The general ZF algorithm can be defined, as follows:

$$y(k) = \sum_{i=1}^{m} w_i \cdot x_i(k) \quad \text{EQ 1}$$

$$e(k) = d(k) - y(k) \quad \text{EQ 2}$$
$$= d(k) - \sum_{i=1}^{m} w_i \cdot x_i(k)$$

$$e_j(k) = e(k-p) \cdot d(k-j+1) \quad \text{EQ 3}$$

$$x_i(k) = \sum_{s=-\infty}^{+\infty} h_i(s) \cdot d(k-s) \approx \sum_{s=-p}^{n-p-1} h_i(s) \cdot d(k-s) \quad \text{EQ 4}$$

$$e(k) = d(k) - \sum_{i=1}^{m} w_i \cdot \sum_{s=-\infty}^{+\infty} h_i(s) \cdot d(k-s) \quad \text{EQ 5}$$
$$\approx d(k) - \sum_{i=1}^{m} w_i \cdot \sum_{s=-p}^{n-p-1} h_i(s) \cdot d(k-s)$$

$$M = \begin{pmatrix} h_1(-p) & h_1(1-p) & \cdots & h_1(n-p-1) \\ h_2(-p) & h_2(1-p) & \cdots & h_2(n-p-1) \\ \vdots & \vdots & \ddots & \vdots \\ h_m(-p) & h_m(1-p) & \cdots & h_m(n-p-1) \end{pmatrix} \quad \text{EQ 6}$$

$$w^{(c+1)} = w^{(c)} + \mu M \{e_j(k)\}^T \quad \text{EQ 7}$$

$$w_i^{(c+1)} = w_i^{(c)} + \mu \sum_{j=1}^{n} h_i(-p+j-1) \cdot e_j(k) \quad \text{EQ 8}$$

Definition of Variables:
- y(k) sequence of filter output at index k
- m number of taps of the filter bank output
- $w_i$ weight parameter for the i-th tap of the filter bank output
- $x_i(k)$ sequence of the i-th tap of the filter bank output at index k
- e(k) sequence of filter output error at index k
- d(k) sequence of transmit data (and recovered data if there is no data error) at index k
- $e_j(k)$ correlation between e(k−p) and d(k−j+1) at index k
- p length of pre-cursor inter-symbol interference (ISI)
- n length of whole span of pre- and post-cursor ISI including center tap
- $h_i(s)$ discrete-time impulse response of the i-th tap of the filter bank output
- M adaptation matrix
- $w_i^{(c)}$ weight parameter for the i-th tap of the filter bank output at iteration c
- $w^{(c)}$ weight parameter vector $w=\{w_i\}^T$ for the filter at iteration c
- μ loop constant One problem with the general ZF algorithm is that the transmit data must be uncorrelated. Mathematically, this can be shown by Equation 9:

$$E[d(k) \cdot d(l)] = \begin{cases} 0 & (k \neq l) \\ 1 & (k = l). \end{cases} \quad \text{EQ 9}$$

In general, this requirement is not satisfied because the original application data to be transmitted may be highly correlated. In prior systems, two ways have been used to satisfy this requirement.

Figure 3:
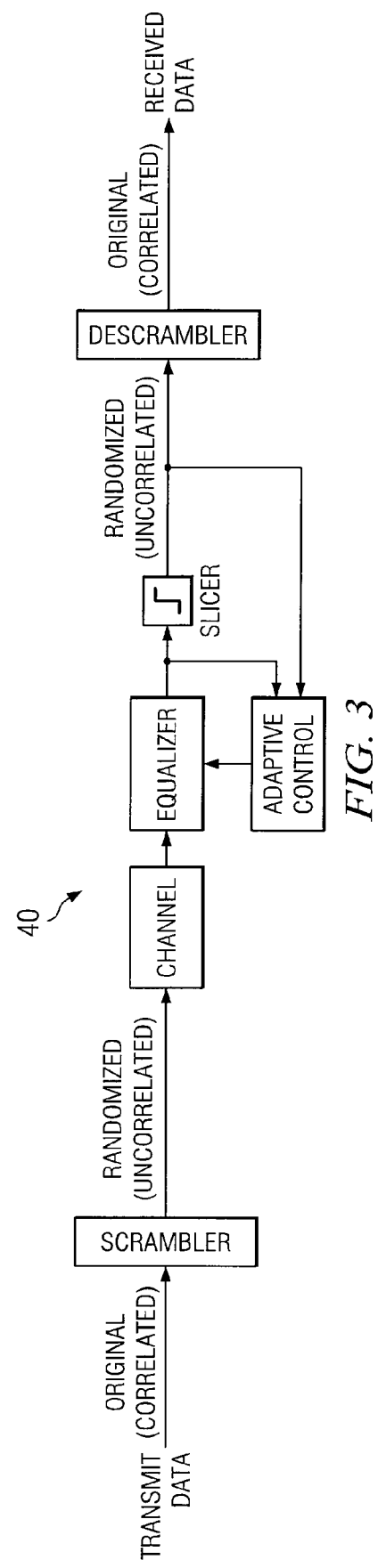
FIG. 3 is a simplified block diagram illustrating an adaptive equalizer control with scrambler and descrambler.

FIG. 3 is a simplified block diagram illustrating an adaptive equalizer control 40 with scrambler and descrambler. One way to avoid the issue outlined above is to use a scrambler and a descrambler. Before transmission, the scrambler randomizes the original data sequence into randomized sequence, and after transmission of the randomized sequence, the descrambler decodes the randomized sequence back to the original data sequence.

Figure 4:
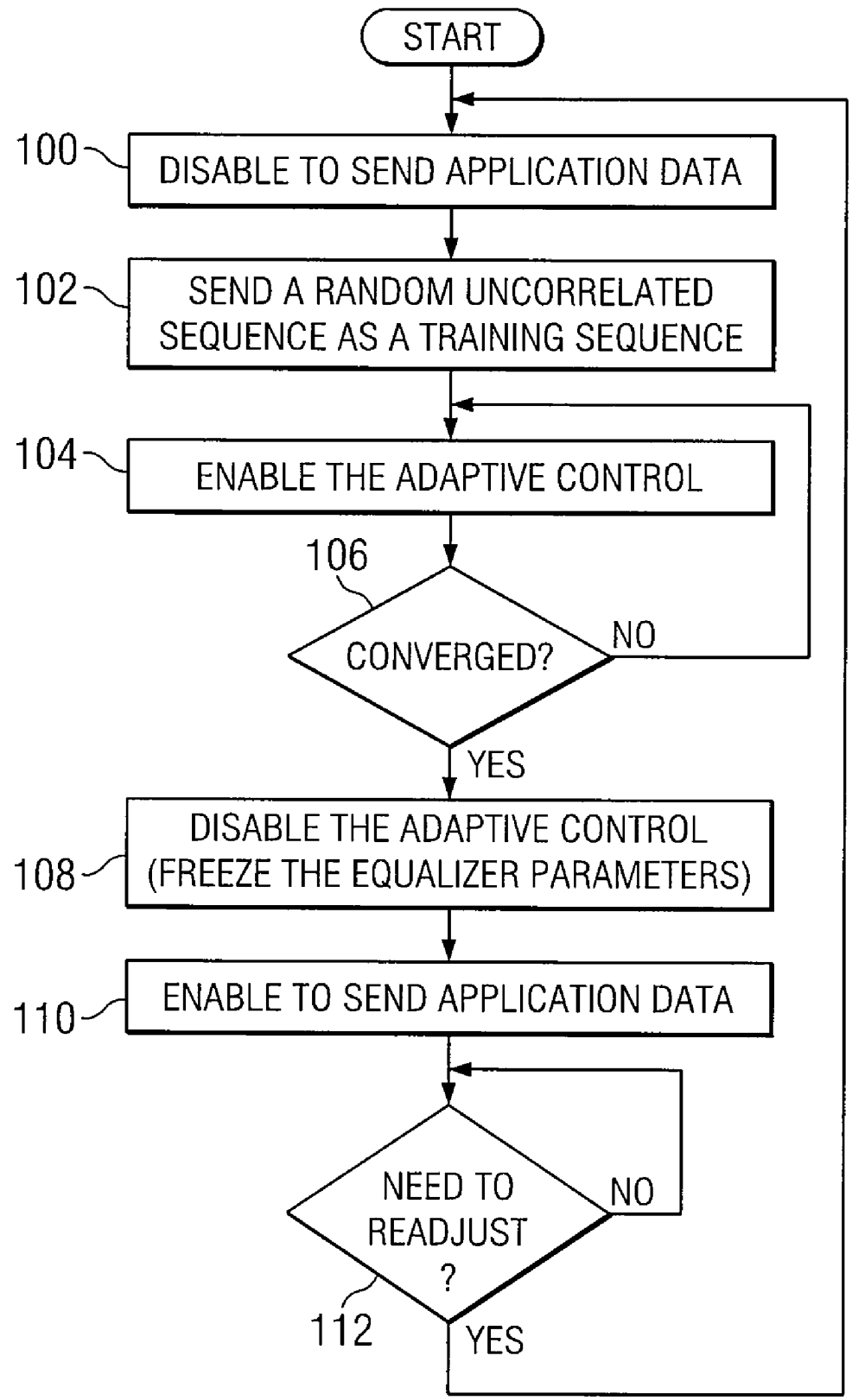
FIG. 4 is a simplified flowchart illustrating a control flow to force a random sequence during the adaptive control.

FIG. 4 is a simplified block diagram illustrating a control flow to force a random sequence during the adaptive control. As evidenced by FIG. 4, another way to address the issue identified above is to use a random uncorrelated sequence as the training sequence and enable the adaptive control only in the training period. The adaptive control should be disabled while transmitting the application data because application data may be correlated.

The method outlined in FIG. 4 begins at step 100, where there is a command to prohibit the sending of application data. At step 102, a random uncorrelated sequence is sent as a training sequence. At step 104, the adaptive control is enabled. If there is convergence, then the flow moves to step 108 where the adaptive control is disabled. At step 110, application data can be sent once again. If there is no adjustment in step 112, the process ends. Where adjustments are necessary, the flow returns to the beginning of the process, as is illustrated.

Note that these two prior methods are not applicable to existing standard interfaces because we cannot change the encoding scheme or the protocol of existing standard. For such existing standard interfaces, we can enable the adaptive control only once in the start up period assuming that the transmitter is sending an idle sequence because the link is not up yet. However, if the idle sequence is correlated, the convergence point by the adaptive control will not be optimal. We cannot change the idle sequence to the desired random uncorrelated sequence because the idle sequence has been already defined as part of the existing standard.

Figure 5:
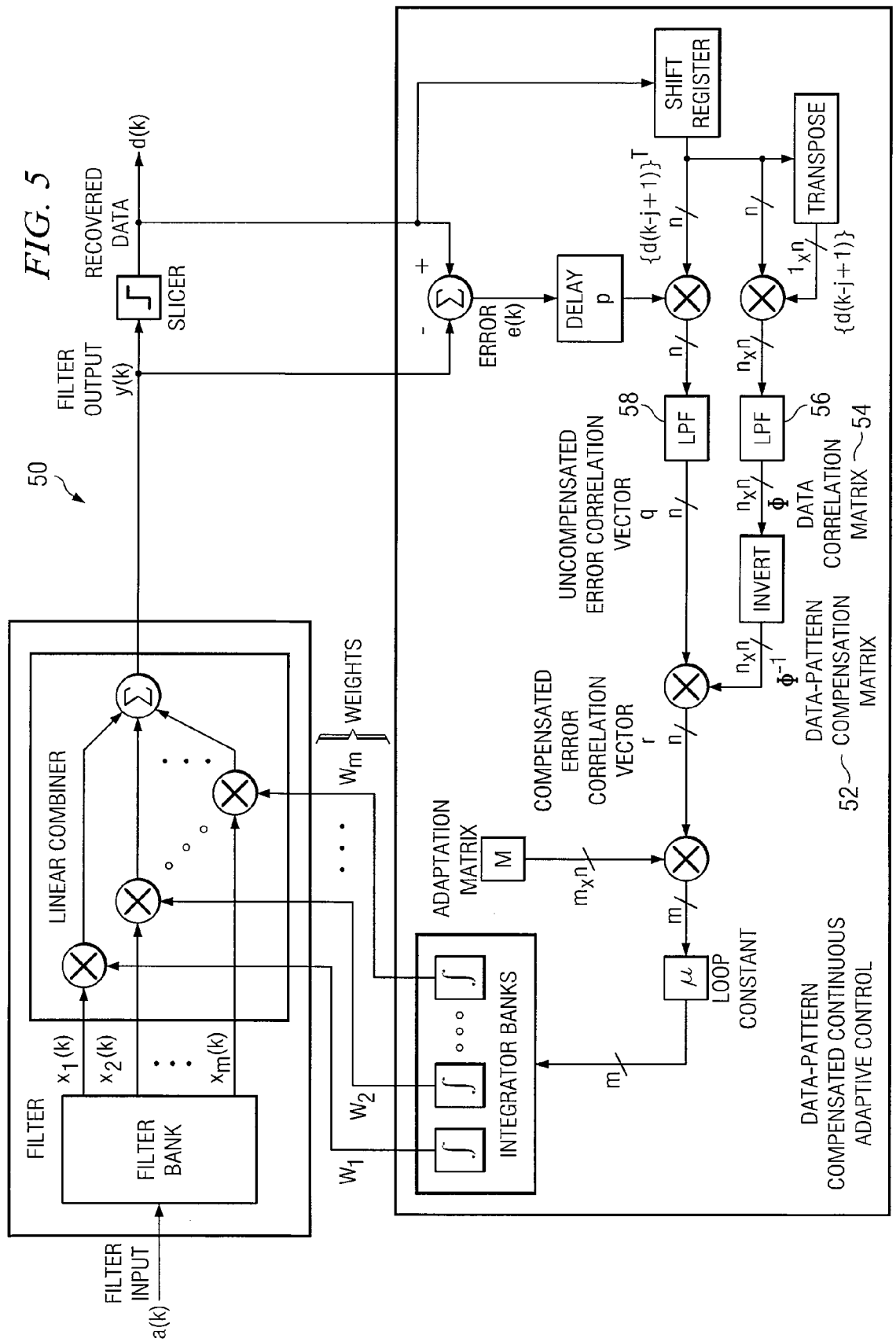
FIG. 5 is a simplified block diagram illustrating a continuous adaptive equalizer control using online data-pattern compensation.

FIG. 5 is a simplified block diagram illustrating a continuous adaptive equalizer control 50 using online data-pattern compensation. FIG. 5 includes a data-pattern compensation matrix 52, a data correlation matrix 54, and two low-pass filters (LPFs) 56 and 58.

Instead of assuming uncorrelated data sequence, the present invention measures the correlation of the data sequence and compensates for the data correlation. FIG. 5 illustrates one implementation of this concept. The uncompensated error correlation vector q is measured with a low-pass filter (LPF) in order to take the average of a certain period. In the same period, the data correlation matrix Φ is also measured using a LPF. After a certain period, the data-pattern compensation matrix $Φ^{-1}$ is calculated as the inverse of Φ, and multiplied with q to yield the compensated error correlation vector r. The compensated error correlation vector r is multiplied with the adaptation matrix M and a loop constant μ, then it is integrated to generate the tap weights $\{w_i\}^T$.

If the data correlation matrix Φ is not invertible, the adaptive control is skipped, and the control proceeds to the next measurement. It may happen for heavily correlated data-patterns, such as single frequency patterns. Since such a pattern does not contain sufficient information for adaptive control, the ideal strategy is to keep the current weight parameters.

This scheme may be used with the general ZF adaptation scheme using a constant adaptation matrix M. This scheme may be also used with the fast steepest-descent method using a variable adaptation matrix M. The decoupling matrix of $(MM^T)^{-1}$ may be also used together with this scheme.

Data-pattern Compensation Algorithm:

$$q = \{q_j | q_j = E[e(k-p) \cdot d(k-j+1)]\}^T$$
$$= \{q_j | q_j = E[d(k+p-j+1) \cdot e(k)]\}^T$$
$$\approx \left\{ q_j \middle| q_j = E\left[ \left| d(k+p-j+1) \cdot \left\{ d(k) - \sum_{i=1}^{m} w_i \cdot \sum_{s=-p}^{n-p-1} h_i(s) \cdot d(k-s) \right\} \right| \right] \right\}^T$$
$$= \left\{ \sum_{i=1}^{m} w_i \cdot \sum_{s=-p}^{n-p-1} h_i(s) \cdot E[d(k+p-j+1) \cdot d(k-s)] \right\}^T$$

EQ 10

$$\Phi = \{\phi_{\eta,j} | \phi_{\eta,j} = E[d(k-\eta) \cdot d(k-j)]\}$$

EQ 11

For an Uncorrelated Data Sequence:

$$q|_{uncorrelated} \approx \left\{ q_j \middle| q_j = \delta_{(p-j+1)} - \sum_{i=1}^{m} w_i \cdot h_i(-p+j-1) \right\}^T$$
$$\equiv u = \left\{ u_j \middle| u_j = \delta_{(p-j+1)} - \sum_{i=1}^{m} w_i \cdot h_i(-p+j-1) \right\}^T.$$

EQ 12

$$\Phi u = \left\{ v_j \middle| v_j = \sum_{\eta=1}^{n} \phi_{j,\eta} \cdot u_\eta \right\}^T$$
$$= \left\{ v_j \middle| v_j = \sum_{\eta=1}^{n} E[d(k-j) \cdot d(k-\eta)] \cdot \left\{ \delta_{(p-\eta+1)} - \sum_{i=1}^{m} w_i \cdot h_i(-p+\eta-1) \right\} \right\}^T$$
$$= \left\{ v_j \middle| v_j = E[d(k-j) \cdot d(k-p-1)] - \left\{ \sum_{i=1}^{m} w_i \cdot \sum_{\eta=1}^{n} h_i(-p+\eta-1) \cdot E[d(k-j) \cdot d(k-\eta)] \right\} \right\}^T$$
$$= \left\{ v_j \middle| v_j = E[d(k-j) \cdot d(k-p-1)] - \left\{ \sum_{i=1}^{m} w_i \cdot \sum_{s=-p}^{n-p-1} h_i(s) \cdot E[d(k-j) \cdot d(k-s-p-1)] \right\} \right\}^T$$
$$= \left\{ v_j \middle| v_j = E[d(k+p-j+1) \cdot d(k)] - \left\{ \sum_{i=1}^{m} w_i \cdot \sum_{s=-p}^{n-p-1} h_i(s) \cdot E[d(k+p-j+1) \cdot d(k-s)] \right\} \right\}^T$$
$$= q$$

EQ 13

If $\Phi$ is Invertible:

$$r = \Phi^{-1} q = u$$

EQ 14

Therefore, the compensated error correlation vector r is always same as the error correlation vector for an uncorrelated sequence u. In terms of advantages in the previously disclosed arrangements and configurations, the advantage of the above scheme is that it works for any data-patterns.

However, its drawbacks are that it requires many resources to measure a data correlation matrix on line, and then calculate the inversion matrix. Here, the measurement of the data correlation matrix and error correlation vector should be done simultaneously. Otherwise, the system cannot keep track of dynamic changes in the data correlation.

There is a multitude of advantages to using such an approach. For example, in using the continuous adaptive control protocol, there is no need for a scrambler and a descrambler and, thereby, this does not yield the latency for the scrambler and the descrambler. Furthermore, such an arrangement is applicable for existing standard interfaces without changes of encoding or protocol.

Additionally, the configuration minimizes the square error for uncorrelated data sequences using any data-pattern. In addition, such an approach automatically stops when the data-pattern does not include sufficient information.

It is critical to note that the components illustrated in FIG. 5 (or in many of the illustrated architectures outlined herein) may be implemented as digital circuits, analog circuits, software, or any suitable combination of these elements. In addition, any of these illustrated components may include software and/or an algorithm to effectuate their features and/or applications as described herein. Alternatively, such operations and techniques may be achieved by any suitable hardware, component, device, application specific integrated circuit (ASIC), additional software, field programmable gate array (FPGA), processor, erasable programmable ROM (EPROM), electrically erasable programmable ROM (EEPROM), or any other suitable object that is operable to facilitate such operations. Considerable flexibility is provided by the structure of these architectures in the context of this arrangement. Thus, it can be easily appreciated that such functions could be provided external to the outlined environment. In such cases, such a functionality could be readily embodied in a separate component, device, or module.

Although the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

What is claimed is:

1. A method, comprising:
    providing a filter and an adaptive control element that is operable to communicate with the filter, the adaptive control element configured to control an equalizer;
    measuring, over a period, a data correlation matrix and an uncompensated error correlation vector using first and second low pass filters; and
    implementing a data-pattern compensation matrix online to control the equalizer, whereby the data-pattern compensation matrix is obtained online dynamically from the data correlation matrix, wherein if the data correlation matrix is not invertible, an adaptive control is skipped, and then a next measurement is taken.

2. The method of claim 1, wherein the low pass filters measure correlation of a data sequence such that the measured correlation is compensated for.

3. The method of claim 1, wherein the filter further includes a linear combiner, a filter bank, a filter input, and recovered data.

4. The method of claim 1, wherein after the period ends, the data-pattern compensation matrix is calculated as the inverse of the data correlation matrix and multiplied with the uncompensated error correlation vector to yield a compensated error correlation vector.

5. The method of claim 4, wherein the compensated error correlation vector is multiplied with an adaptation matrix and a loop constant and then integrated to generate tap weights.

6. The method of claim 1, wherein the method is used with a general Zero Forcing ("ZF") adaptation scheme using a constant adaptation matrix.

7. The method of claim 1, wherein the method is used with a fast steepest-descent method using a variable adaptation matrix.

8. The method of claim 1, wherein a compensated error correlation vector is the same as the uncompensated error correlation vector for uncorrelated sequences.

9. The method of claim 1, wherein the measurement of the data correlation matrix and the error correlation vector are done simultaneously such that dynamic changes in data correlation are tracked.

10. A non-transitory computer-readable medium embedded with logic and operable to:
provide a filter and an adaptive control element that is operable to communicate with the filter;
measure, over a period, a data correlation matrix and an uncompensated error correlation vector using first and second low pass filters; and
implement a data-pattern compensation matrix online, whereby the data-pattern compensation matrix is obtained online dynamically from the data correlation matrix, wherein if the data correlation matrix is not invertible, an adaptive control is skipped, and then a next measurement is taken.

11. The non-transitory computer-readable medium of claim 10, wherein the low pass filters measure correlation of a data sequence such that the measured correlation is compensated for.

12. The non-transitory computer-readable medium of claim 10, wherein after the period ends, the data-pattern compensation matrix is calculated as the inverse of the data correlation matrix and multiplied with the uncompensated error correlation vector to yield a compensated error correlation vector.

13. The non-transitory computer-readable medium of claim 12, wherein the compensated error correlation vector is multiplied with an adaptation matrix and a loop constant and then integrated to generate tap weights.

14. The non-transitory computer-readable medium of claim 10, wherein the method is used with a general Zero Forcing ("ZF") adaptation scheme using a constant adaptation matrix.

15. The non-transitory computer-readable medium of claim 10, wherein a compensated error correlation vector is the same as the uncompensated error correlation vector for uncorrelated sequences.

16. A system, comprising:
an equalizer;
a filter; and
an adaptive control element that is operable to communicate with the filter to control the equalizer, wherein over a period, a data correlation matrix and an uncompensated error correlation vector are measured using first and second low pass filters, whereby a data-pattern compensation matrix is processed online, the data-pattern compensation matrix being obtained online dynamically from the data correlation matrix, wherein if the data correlation matrix is not invertible, an adaptive control is skipped, and then a next measurement is taken.

17. The system of claim 16, wherein the low pass filters measure correlation of a data sequence such that the measured correlation is compensated for.

18. The system of claim 16, wherein the filter further includes a linear combiner, a filter bank, a filter input, and recovered data.

19. The system of claim 16, wherein after the period ends, the data-pattern compensation matrix is calculated as the inverse of the data correlation matrix and multiplied with the uncompensated error correlation vector to yield a compensated error correlation vector.

20. The system of claim 19, wherein the compensated error correlation vector is multiplied with an adaptation matrix and a loop constant and then integrated to generate tap weights.

21. The system of claim 16, wherein the method is used with a general Zero Forcing ("ZF") adaptation scheme using a constant adaptation matrix.

22. The system of claim 16, wherein the method is used with a fast steepest-descent method using a variable adaptation matrix.

23. The system of claim 16, wherein a compensated error correlation vector is the same as the uncompensated error correlation vector for uncorrelated sequences.

* * * * *